Patented Aug. 14, 1928.

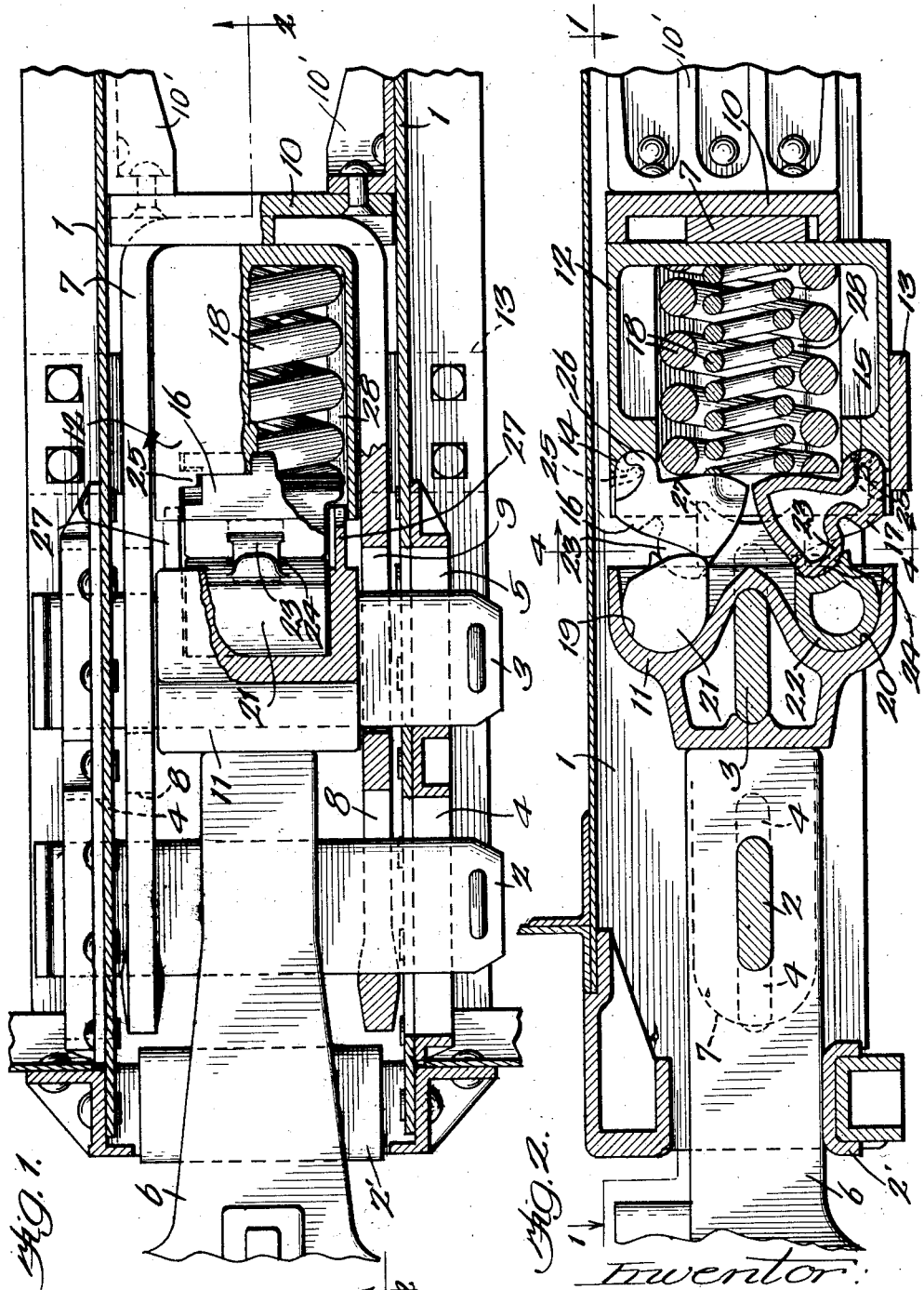

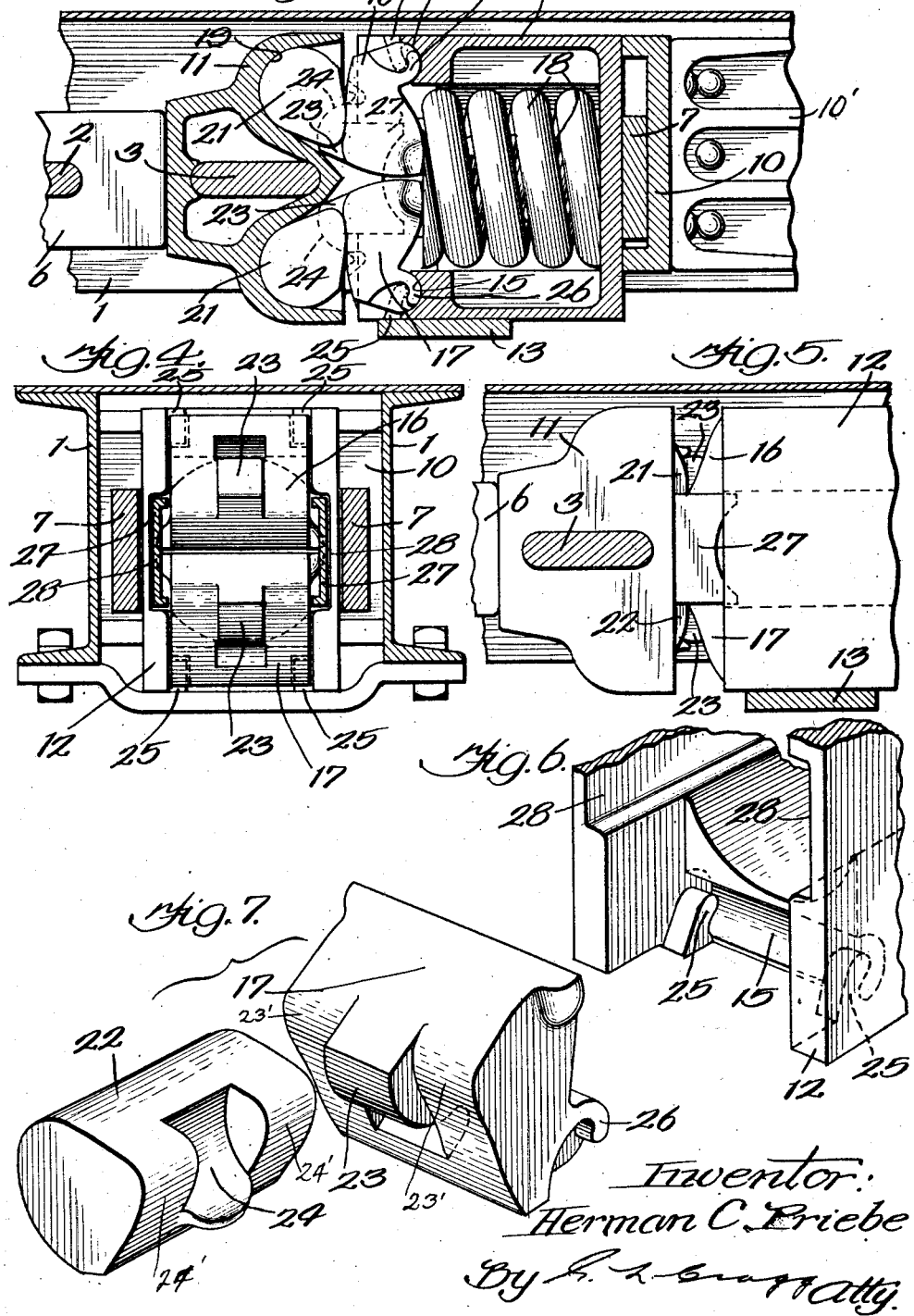

1,680,477

UNITED STATES PATENT OFFICE.

HERMAN C. PRIEBE, OF BLUE ISLAND, ILLINOIS.

DRAFT GEAR.

Application filed March 21, 1927. Serial No. 177,045.

My invention relates to draft gears of the class employing rocker mechanism which is subject to and takes part in resisting draft strains.

My invention is of particular use in connection with draft gears in which friction is produced to retard its operation, though the invention is not to be thus limited.

The gear of my invention includes at least two coacting rockers and preferably two sets of such rockers. A spring cooperates with the coacting rockers to oppose draft strains, and when the invention is embodied in a friction producing gear, the friction produced by the gear also takes part in opposing draft strains, the spring being of further service in moving rockers toward idle positions on reduction of draft strains. Each coacting rocker of a set is mounted to turn in one follower and the remaining rocker in another follower. The spring element of the gear is interposed between one of the followers and the rockers that are mounted to turn upon this follower, there desirably being no spring mechanism between the other follower and the rockers mounted to turn thereon. The follower which is associated with the spring is desirably in the form of a housing for the spring, this follower being so supported and of such dimensions that it will be confined to movement along the line of travel. The other follower may tend to tilt due to the weight of the rockers carried thereby and in order to overcome this tendency, the two followers have portions that are in sliding engagement, these portions extending along the line of draft and thereby guiding and confining this said other follower to a straight line of travel along the line of draft. The various rockers are desirably seated within open sockets provided in the followers. To prevent the rockers that are journaled upon the follower that also constitutes the housing for the spring from leaving their sockets, I provide this follower and these rockers with interengaging formations which hold these rockers in their sockets. To provide a true toggle lever action between the coacting rockers of each set, the engaging surface of these rockers are curved and coaxial or concentric. The rockers that are mounted to turn upon the follower that houses the spring are arranged to turn more freely in their bearings than do the rockers that are mounted to turn upon the other follower, the friction produced by these latter rockers being more largely relied upon to supplement the action of the spring in resisting movement. Where the rockers which are mounted to turn upon the follower that houses the spring are seated within sockets in which these rockers turn, the areas of the sockets which are engaged by these sockets are less than the areas of the sockets which are engaged by the other rockers so that the friction produced by these other rockers at their seats preponderates.

The invention will be more fully explained by reference to the accompanying drawings in which Fig. 1 is a sectional plan view of the preferred embodiment of the invention taken on line 1—1 of Fig. 2, the gear being shown under no material compression; Fig. 2 is a sectional elevation taken on line 2—2 of Fig. 1; Fig. 3 is a sectional elevation of a part of the gear showing it under compression; Fig. 4 is a sectional view on line 4—4 of Fig. 2; Fig. 5 is a view with parts positioned as illustrated in Fig. 2 but mainly shown in elevation; Fig. 6 is a perspective view of a portion of the follower which also constitutes a housing for the spring; and Fig. 7 is a perspective view of two coacting rockers in separated relation.

The draft gear illustrated includes the draft or center sills 1 which carry keys 2 and 3 that move horizontally and longitudinally of the sills within slots 4 and 5 formed in the sills. The key 2 serves to assemble the coupler stem 6 with the outer ends of the coupler yoke 7, provision for lost motion between the stem and yoke being preferably afforded by elongating the slots 8 in the sides of the coupler yoke and through which the key 2 passes. The coupler stem is supported by the key 2 and also by the bridge piece 2' between the center or draft sills 1. The key 2, thus preferably in lost motion engagement with the coupler yoke, also serves to support the outer ends of the coupler yoke upon the center sills. The key 3 serves as a further support for the coupler yoke in the region of the outer end of the yoke, this key passing through slots 9 in the sides of the coupler yoke for this purpose. These slots are longer than the width of the key 3 so that this key may also have lost motion engagement with the coupler yoke. The inward movement of the yoke is limited by a stop 10 which extends between and is rigidly assembled with both center sills. The outward movement of the yoke is limited by the outer ends of the slots 5 that are engaged by the outer transverse edge of the key 3 when the inner ends of the slots 9 in the yoke sides engage this key and move it outwardly to its yoke holding position. An outer follower 11 is engaged by the inner or butt end of the coupler stem 6 and the inner follower 12 is surrounded by the coupler yoke. The outer follower 11 is carried by the key 3 and floats therewith. The inner follower 12 is supported by the bridge piece or strap 13 underlying the same and secured to the bottom sides of the center sills. The outer follower 11 is limited in its outward movement by the outer ends of the draft sill slots 5 that limit the outward movement of the key 3. The inward movement of the inner follower 12 is limited by the stop formation 10 carried by the center sills.

One of the followers, preferably the inner follower 12, is hollow and shaped to constitute a spring barrel or housing that opens toward the other follower. This follower 12 is also formed with sockets 14 and 15 in which are fulcrumed the inner rockers 16 and 17, these rockers projecting toward the axis of the follower 12 to be engaged by coiled springs 18 which are interposed between said rockers and the closed or inner end of said hollow follower 12. The other follower, the outer follower 11 as illustrated, is formed with sockets 19 and 20 which are desirably materially larger than the sockets 14 and 15. The sockets 19 and 20, respectively, have fulcrumed therein the outer rockers 21 and 22. The rockers 16 and 21 coact, as do the rockers 17 and 22, the rockers thus being arranged in pairs. The inner rockers 16, 17 have wing portions 23 that turn upon and within the sockets 24 provided in the outer rockers 21, 22. The engaging surfaces of these sockets and wings are concentric, thereby affording the best toggle leverage action between the rockers 16 and 17 and the rockers 21 and 22. The portions 23', 24' of each two coacting rockers that are upon the sides of the formations 23, 24 also have engagement and take part in the toggle leverage action between these rockers, the engaged concentric or coaxial surfaces of the formations 23 and 24 holding the coacting rockers in cooperative relation. When the follower 12 is moved outwardly in response to pulling strains of sufficient force, or when the follower 11 is moved inwardly in response to pushing strains of sufficient force, the rockers 21 and 22 are turned toward each other and respectively turn the rockers 16 and 17 toward each other and against the force of the springs 18, which springs through the intermediation of the rockers 16 and 17 resist the turning movement of the rockers 21 and 22, that are in friction producing engagement with the sockets 19 and 20. In this operation the compression of the springs 18 is increased. When the draft strains are lessened or cease the springs 18 expand and turn all of the rockers reversely. The sockets 14 and 15 are materially smaller than the sockets 19 and 20 whereby the friction resulting from the engagement between the first two sockets and the rockers 16 and 17 is much less than the friction resulting from the engagement between the other rockers 21 and 22 and their sockets, whereby the rockers 16 and 17 are capable of freer operation and are not held from operation by the lesser friction they produce at their sockets.

To prevent the rockers 16 and 17 from being unseated during any operation of the gear, I provide hook formations 25 upon the follower 12 and in front of the sockets 14 and 15 in this follower and other hook formations 26 upon the rockers 16 and 17, the formations 25 and 26 interengaging or intermeshing to hold these rockers upon their seats.

To prevent the follower 11 from tilting, I provide the same with horizontal guiding tongues 27 which enter horizontal guide ways or grooves 28 in the follower 12. These tongues and grooves extend longitudinally of the gear and are adjacent the outer upright longitudinal faces of the rockers. The tongues and grooves confine follower 11 to the line of travel of the follower 12, this line of travel being coincident with the line of draft. The sockets 19 and 20 are inwardly extended to form hoods which hold the rockers 21 and 22 from vertical displacement.

It will be observed that the stop formation 10 illustrated is in the form of a channel bar which is riveted to the lugs 10'. The channeled side of this bar faces the inner end of the inner follower 12, the intermediate or base portion of the yoke 7 being received in the channel of the stop formation 10 and being of a thickness which is coextensive with the depth of this channel so that the follower will have abutting engagement with the horizontal marginal portions of the channel bar 10 and will have thrusting relation to the base portion of the channel bar through the intermediation of the inner end of the yoke.

Changes may be made without departing from the invention.

Having thus described my invention, I claim:

1. A draft gear including two followers; coacting rockers respectively mounted to turn upon said followers; intermeshing hook formations provided upon one of said followers and the rocker mounted thereon and positioned to hold this rocker at its seat; and a spring carried by the latter follower and pressing the rocker mounted to turn on this follower into cooperative relation with the other rocker.

2. A draft gear including two followers; coacting rockers respectively mounted to turn upon said followers, one follower having an open socket receiving the rocker mounted upon this follower; interengaging formations provided upon the latter follower and rocker and adjacent said socket and serving to hold said rocker in its socket; and a spring carried by the latter follower and pressing the rocker mounted to turn on this follower into cooperative relation with the other rocker.

3. A draft gear including two followers; coacting rockers respectively mounted to turn upon said followers; intermeshing hook formations provided upon one of said followers and the rocker mounted thereon and positioned to hold this rocker at its seat; and spring means yieldingly resisting the motion of the rockers and holding the rockers in engagement.

4. A draft gear including two followers; coacting rockers respectively mounted to turn upon said followers, one follower having an open socket receiving the rocker mounted upon this follower; interengaging formations provided upon the latter follower and rocker and adjacent said socket and serving to hold said rocker in its socket; and spring means yieldingly resisting the motion of the rockers and holding the rockers in engagement.

5. A draft gear including two followers; coacting rockers respectively mounted to turn upon said followers; interengaging guiding tongue and groove formations respectively provided upon said followers serving to confine one follower to the line of travel of the other; and spring means yieldingly resisting the motion of the rockers and holding the rockers in engagement.

In witness whereof, I hereunto subscribe my name.

HERMAN C. PRIEBE.